Nov. 28, 1950 H. R. CANFIELD 2,531,611
SPEED RESPONSIVE DEVICE
Filed April 22, 1948 3 Sheets-Sheet 1
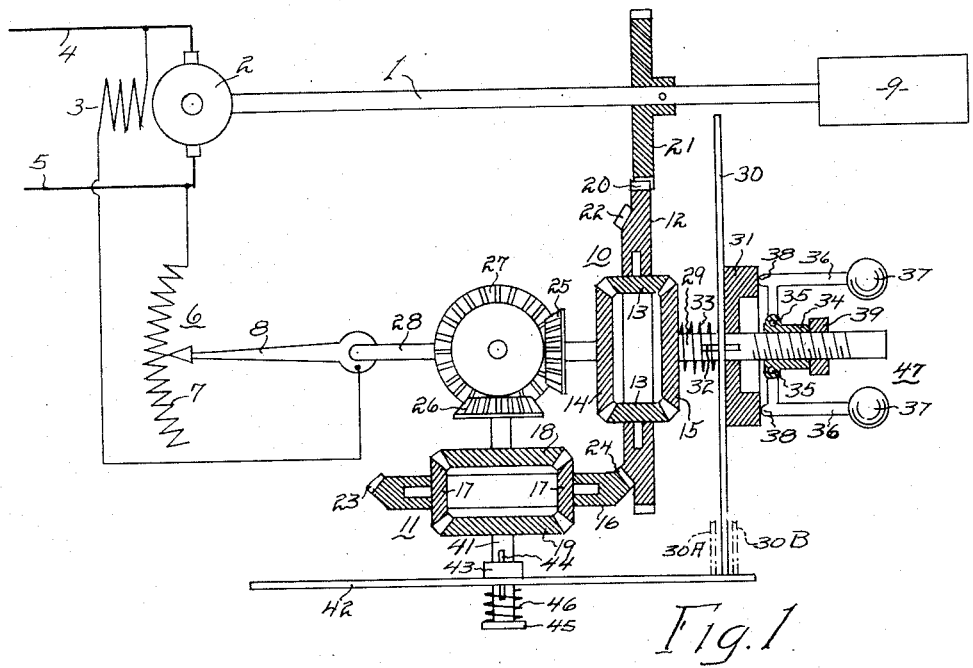
Fig. 1
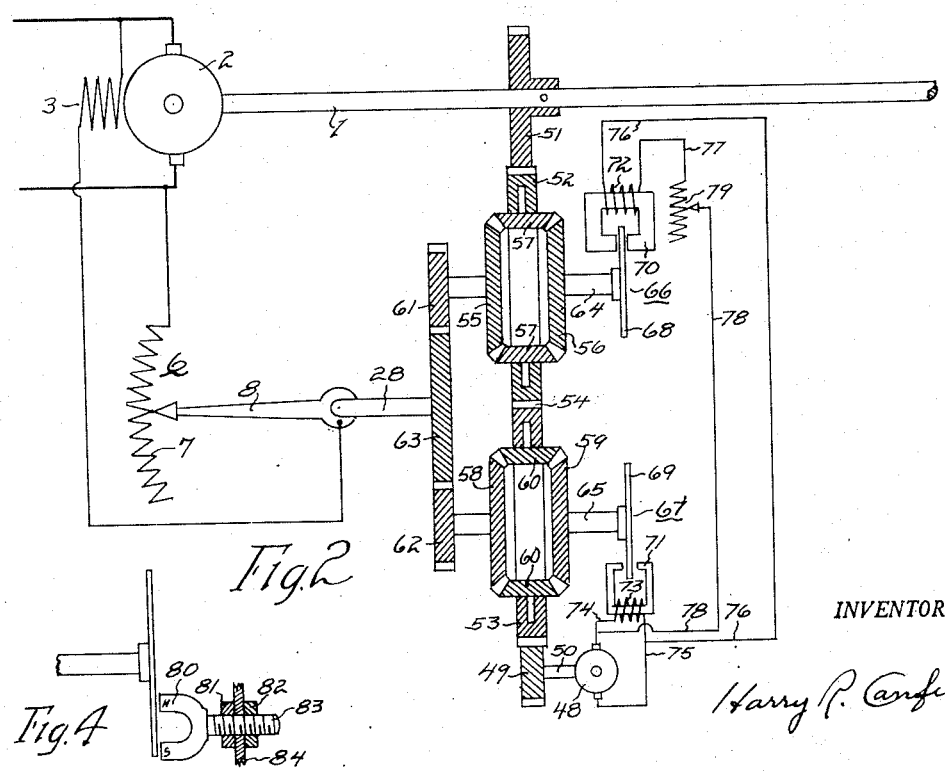
Fig. 2
Fig. 4
INVENTOR.
Harry R. Canfield Nov. 28, 1950    H. R. CANFIELD    2,531,611
SPEED RESPONSIVE DEVICE Filed April 22, 1948    3 Sheets-Sheet 2

INVENTOR.
Harry R. Canfield

Nov. 28, 1950  H. R. CANFIELD  2,531,611
SPEED RESPONSIVE DEVICE
Filed April 22, 1948  3 Sheets-Sheet 3
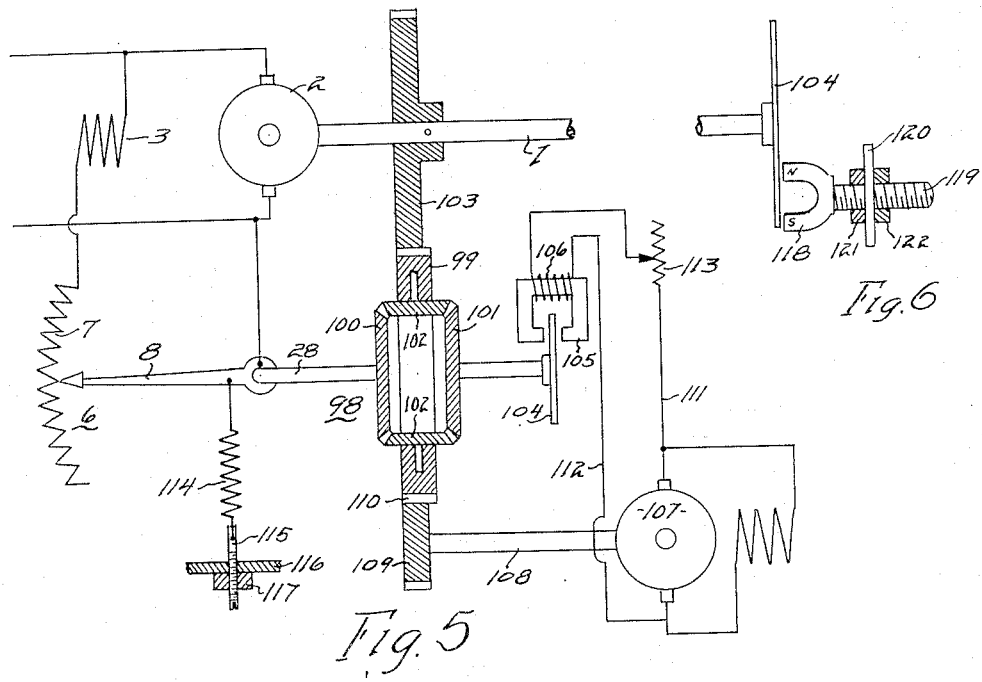
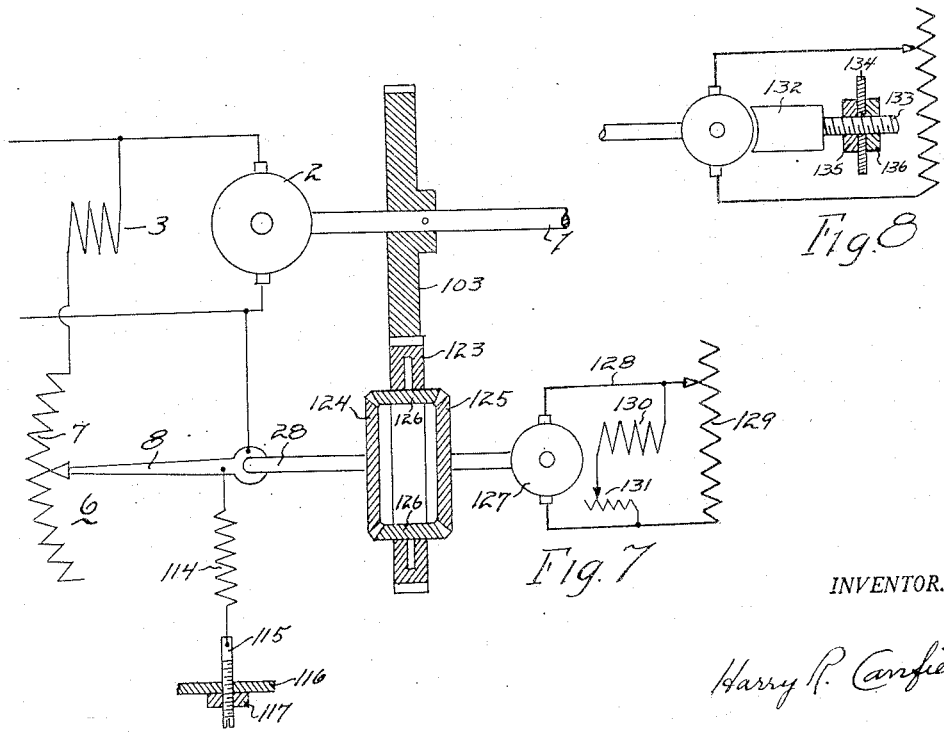
INVENTOR.
Harry R. Canfield Patented Nov. 28, 1950

2,531,611

UNITED STATES PATENT OFFICE 2,531,611

SPEED RESPONSIVE DEVICE

Harry R. Canfield, Cleveland Heights, Ohio, assignor to Lev A. Trofimov, Willoughby, Ohio Application April 22, 1948, Serial No. 22,577

6 Claims. (Cl. 264—9)

This invention relates to mechanisms of the class that have parts rotatably driven by a power source, and which perform some function in response to changes of driven speed.

One type of mechanism of this general class as heretofore proposed, comprises a rotary power input and a rotary power output, the output remaining at rest so long as the input rotates at a predetermined speed; and the output being set into rotary motion in one direction or the other when the input speed increases above or decreases below the predetermined speed.

The present invention relates to mechanisms of this general type.

As illustrative of the uses of such mechanisms, it is in some cases contemplated that the input speed will be derived from the speed of some rotary element whose speed is to be kept constant.

The rotary output is in such a case connected to a controller to actuate it to cause it to restore the speed of the rotary element back to its predetermined speed upon deviations therefrom.

One of the objections to such prior mechanisms is, that the rotary output being normally at rest, must be started up from rest by some kind of a clutch or friction drive, engageable with a rotary element driven by the input, when a deviation of speed of the latter from the predetermined speed occurs; and disengaged from it when the speed is at the predetermined value, thus not only introducing reciprocatory movement and lost motion and unreliability at the clutch, but unavoidably introducing an idle range of speeds between the predetermined speed and the speed at which the device operates, and within which range the device is inoperative, and therefore, as a whole, inaccurate.

The present invention departs from prior mechanisms by comprising a rotary output always subjected to ever present opposing torques. The torques are equal when the input is driven at a predetermined speed whereby the output remains at rest; and become unequal when the input speed deviates from said speed. One torque predominates when the driven speed increases; the other predominates when the driven speed decreases. The output thus starts to rotate immediately at the slightest deviation of input speed and rotates at speeds proportional to the degree of deviation in one direction or the other, accordingly as the deviation of input speed is above or is below a predetermined speed.

An object of the invention is to provide a mechanism having these characteristics of operation and obviating the above stated objections to prior mechanisms.

In general, the invention comprises a unitary mechanism having a rotary output element subjected to a biasing torque in one rotary direction; and differential gearing driven by input power and transmitting torques in two directions, in one direction to the output element in opposition to the biasing torque thereon, and in the other direction to a torque developing means which develops torque commensurable with input speed; the developed torque causing the torque in said one direction to equal the biasing torque thereby causing the output to be at rest at a predetermined input speed; and causing the torque in said one direction to be greater than or less than the biasing torque, at deviations of input speed from the predetermined value, thereby causing the output element to rotate in one direction or the other.

The invention is fully disclosed in the following description taken in connection with the accompanying drawing, in which:

Fig. 1 is a diagrammatic view illustrating one embodiment of the invention, utilizing two differential gearings;

Figs. 2 and 3 are views similar to Fig. 1 but illustrating other embodiments of the invention, utilizing two differential gearings;

Fig. 4 is a view of a part of Fig. 2 in a modified form;

Fig. 5 is a view of an embodiment of the invention similar to Fig. 2 but utilizing one differential gearing;

Fig. 6 is a view of a part of Fig. 5 in a modified form;

Fig. 7 is a view of an embodiment of the invention similar to Fig. 3 but utilizing one differential gearing;

Fig. 8 is a view of a part of Fig. 7 in a modified form.

Figure 3:
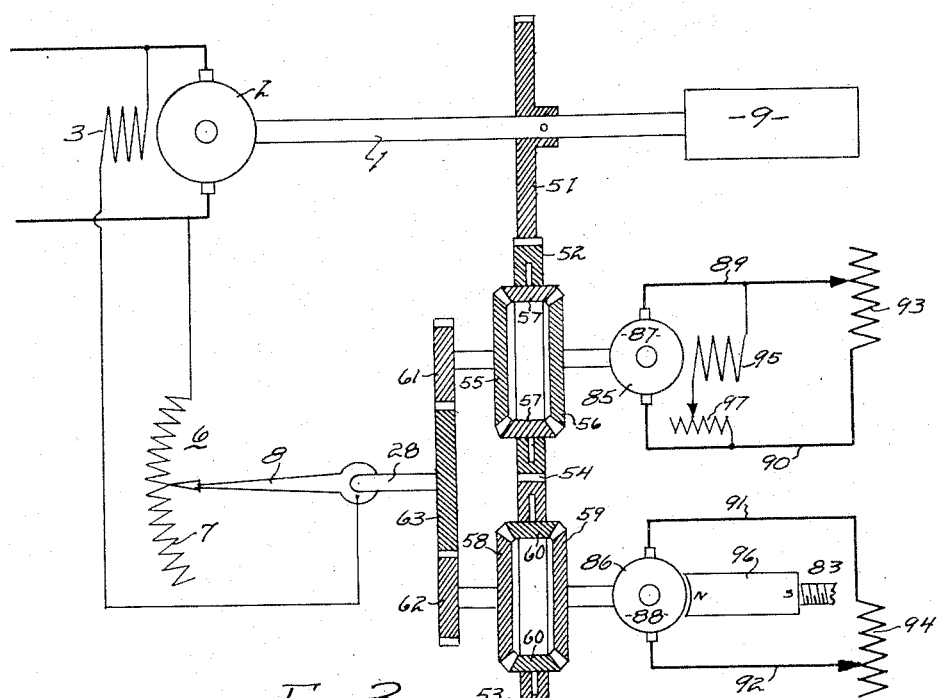

While as mentioned, mechanisms of the class and type embodying the invention may utilize the output to perform various operations and functions, I have chosen, as a concrete illustrative example of use, its application to the regulation of the speed of a motor driven power shaft to maintain the shaft at constant predetermined speed.

Referring to Fig. 1 of the drawing, there is shown at 1, the rotary power shaft whose speed is to be regulated to constant value. It is driven by an electric motor 2, having a shunt field winding 3, energized from mains 4—5. The field winding has a rheostat 6 comprising a resistor 7 and a contact arm 8 movable thereover, in series with it, to control the field strength and the speed of the motor. The power shaft 1 is connected to a device or load 9 to drive it.

Regulation of the speed of the shaft 1 to constant value is effected by automatic movement of the arm 8 by the speed responsive mechanism embodying the invention now to be described.

At 10 and 11 are differential gearings. The gearing 10 comprises a spider 12 rotatably supporting pinions 13—13, which mesh with differential gears 14—15.

The gearing 11 comprises a spider 16 rotatably supporting pinions 17—17 meshed with gears 18—19.

The spider element 12 has peripheral gear teeth 20 meshed with the teeth of a gear 21 on the shaft 1, and by which it is driven at a speed proportional to that of the shaft 1.

The spider elements 12 and 16 have their rotational axes at right angles to each other and are provided with peripheral bevel teeth 22—23 mutually meshed at 24; whereby the spiders 12 and 16 are both driven by the gear 21. The spiders are preferably of the same diameter and therefore rotate at the same speed and in opposite directions.

Connected to the gears 14 and 18 are respectively bevel gears 25—26, both meshed with a bevel gear 27 connected to a shaft 28 upon which is mounted the rheostat arm 8.

A shaft 29 is connected to the gear 15. A disc 30 having a hub 31 is axially reciprocable on the shaft 29, but splined as at 32 to rotate therewith; and is yieldably held away from the gear 15 by a compression spring 33.

On the shaft 29, outwardly beyond the hub 31 is threaded a head 34 to opposite sides of which at 35—35, are pivoted arms 36—36 carrying centrifugal balls 37—37.

Extensions 38—38 on the arms 36—36 abut upon the hub 31. The head 34 threaded on the shaft 29 is secured to rotate therewith by a lock nut 39; and by this means the head may be adjusted along the shaft.

It is believed to be apparent that with this arrangement, upon rotation of the shaft 29, the balls 37—37 will tend to move outwardly; and at a speed determined by the tension of the spring 33 will so move and, through the extension 38—38 and hub 31, propel the disc 30 inwardly toward the gear 15; and upon falling below that speed, the disc 30 will be propelled outwardly again by the spring 33.

By adjusting the head 34 along the shaft 29, the predetermined speed of the shaft 29 may be adjustably varied as will be understood.

The differential gear 19 is connected to a shaft 41 upon which a disc 42 having a hub 43 is splined as at 44 for axial movement on the shaft, and the shaft has a head 45 spaced from the hub 43; and a spring 46 between the head 45 and hub 43 surrounding the shaft yieldably holds the disc 42 toward the gear 19.

The discs 42 and 30 by this construction are at right angles to each other. The disc 42 is large enough in diameter to always overlap the periphery of the disc 30; and the parts are disposed so that the face of the disc 42 is held in engagement with the periphery of the disc 30 by the spring 46.

For one axial position of the disc 30, that shown in solid line, the disc 30 will roll on the disc 42 on a circle the diameter of which is the same as the diameter of the disc 30. Other positions for the disc 30, are indicated in broken line at 30A and 30B.

Preferably the gears of the differential gearings 10 and 11 are alike. The spiders 12—16 will therefore rotate at the same speed, and in opposite directions, and equal torques will be transmitted to the gears 14—15 and to the gears 18—19.

If the disc 30 is in the solid line position, and the two discs 30—42 therefore are rotating at the same speed, the torques transmitted to the gears 25—26 will be equal and opposite; and, both being meshed with the gear 27, they and the gear 27 will remain at rest, and the shaft 28 and arm 8 will be at rest. This is the condition when the shaft 1 is at the desired predetermined speed; the centrifugal device, indicated generally at 47 and described above, having been adjusted as described, to cause the disc 30 to take up its solid line position, and at which it and the disc 42 rotate at the same speed.

If now the shaft 1 should deviate from the predetermined speed, say increase or start to increase in speed, the gears 15—19 and discs 30—42 will both increase in speed; the balls 37—37 will move outwardly; the disc 30 will be moved toward the gear 15, and to a position of which 30A is illustrative; the disc 42 and gear 19 will thereby be caused to rotate faster than the disc 30 and gear 15; gears 25—26 will therefore tend to rotate at different speeds, the torques thereof will be different, and accordingly gear 27, shaft 28, and arm 8 will be rotated; the energization of field winding 3 will be changed. By suitably poling the connection to the resistor 7, this will cause the motor field to be strengthened and cause the motor 2 and shaft 1 to slow down until the two discs 30—42 are again at the same speed at which the rheostat shaft 28 is at rest, and this is the predetermined speed of the shaft 1.

It is to be particularly observed that the tendency of the shaft 1 to increase in speed from the predetermined speed is not merely counteracted so that the shaft speed stops increasing; but that the speed of the shaft is reduced back again to the original predetermined speed.

A like action occurs if the shaft 1 tends to decrease in speed; the disc 30 in this case moving over to a position represented at 30B, causing the rheostat shaft 28 to rotate in the opposite direction to speed up the motor 2 and shaft 1 to restore them to the predetermined speed.

In the form of the invention shown in Fig. 2, the shaft 1, motor 2, field 3, rheostat 6, and shaft 28 for operating it, are reproduced from Fig. 1.

A gear 51 on the shaft 1 drives two differential spiders 52—53 having gear teeth meshed as at 54. Differential gears 55—56 are driven by pinions 57 on the spider 52; differential gears 58—59 are driven by pinions 60 on the spider 53. The gears 55—58 drive gears 61—62 both meshed with a gear 63 connected to the rheostat shaft 28.

A generator 48 is driven by a gear 49, meshed with the teeth of the spider 53 and mounted on a generator shaft 50.

The gears 56—59 are connected by shafts 64—65 respectively to generators 66—67 comprising metal discs 68—69 rotating between the poles of electromagnets 70—71 having energizing windings 72—73.

The winding 73 is connected across the generator 48 by wires 74—75.

The winding 72 is energized by the generator 48 through wires 75—76—77—78, an adjusting resistor 79 being interposed in the line of wires 77—78.

The cross section of the magnet 71 is restricted so that at the speed of the generator 48 corresponding to the predetermined speed of the shaft 1, the potential of the generator 48 energizes the magnet to a degree approaching magnetic saturation; and the magnet 70 is of ample cross section so that its magnetization rises and falls with increase and decrease of the potential of the generator 48 as its speed changes.

Current generated in the discs 68—69 by their rotation in the fields of the magnets 70—71, develop torque loads on the shafts 64—65 and gears 56—59.

When these torque loads are equal, the torques at gears 55—58 and at gears 61—62 are equal and opposite and the gear 63 and shaft 28 are held at rest.

The rheostat 79 can be adjusted to vary the torque load on the disc 68 to make it equal to that on the disc 69 and to thus hold the rheostat shaft 28 at rest, when the shaft 1 and generator 48 are driven at the desired predetermined or preselected speed.

Any tendency of the predetermined speed to change, changes the output potential of generator 48, and energization of magnet 70 relative to magnet 71; and changes the torque on gear 56 relative to the torque on gear 59; causing the torques on the gears 55—58 and 61—62 to be unequal. This operates the rheostat 6 to restore the speed of shaft 1 to the predetermined speed as described for Fig. 1. A similar action occurs for a decrease of speed of shaft 1.

Instead of a magnet 71 always highly energized as in Fig. 2 a permanent magnet 80 may be utilized at the disc 69 as in Fig. 4. And in this case, adjustment of the predetermined speed may be effected by moving the magnet 80 toward or from the disc 69 by shifting lock nuts 81—82 along a threaded stem 83 attached to the magnet, and by which it is mounted upon a support 84.

In the form of Fig. 3, the shaft 1 whose speed is to be regulated, the gears 51 to 63 inclusive, and the rheostat 6 operated by shaft 28 have been reproduced from Fig. 2, for simplication, and again the speed of shaft 1 is controlled by the field rheostat 6 for the motor 2.

In this form, the gears 56—59 drive generators 85—86 comprising rotors 87—88.

The generators have load circuits 89—90 and 91—92 containing adjustable load resistors 93—94. The generator 85 has a field produced by a shunt field winding 95 energized by the generator potential. The generator 86 has a field produced by a permanent magnet 96.

The current output of the generators produces load torque at the gears 56—59 and when these torques are equal, the torques at gears 55—58 and at gears 61—62 are equal and opposite and the rheostat arm 8 remains at rest. This condition can be caused to obtain when the shaft 1 is rotating at the desired speed, by adjusting the load torque producing resistors 93 and 94 relative to each other.

The adjustment can also be made by adjusting the field strength of the generators relative to each other, either by moving the magnet 96 by the arrangement described for Fig. 4 or by providing an adjustable resistor in the circuit of the field winding 95 as shown at 97.

After the adjustment has been made if the shaft 1 should tend to change speed, say increase, both generators 85 and 86 will increase in speed; the potential of generator 86 will increase proportional to its speed increase because its field is constant and an increase of current load and torque proportional to the speed increase will occur.

At the generator 85 its potential will increase, increasing the current load torque; increase of its potential increases the field strength; this further increases the potential and current load torque and so on until equilibrium is attained at which the potential and current load torque have increased more than proportionally to the speed increase.

The torque of generator 85 is therefore greater than the torque of generator 86.

The torques at gears 61—62 are therefore unbalanced and the rheostat 6 is operated thereby to reduce the motor speed and speed of shaft 1 to restore the latter to its original predetermined value as described for Fig. 1.

A similar action occurs for a decrease of speed of shaft 1.

In the form of Fig. 5, as compared with Fig. 2, a single differential gearing 98 is utilized, comprising a spider 99 driving gears 100—101 by pinions 102; the gear 100 is connected to the output shaft 28; and the arm 8, resistor 7, motor field 3, motor 2, driving shaft 1, are all reproduced from Fig. 2.

A gear 103 on shaft 1 drives the spider 99.

The gears 100—101 tend to be driven in the same direction by the spider 99.

The gear 101 drives a generator disc 104 whereat torque is developed by a magnet 105 energized by a winding 106 supplied with current by the potential of a generator 107 driven through a shaft 108 by a gear 109 meshed at 110 with the teeth on the spider 99, the generator being connected to the winding 106, by wires 111—112; and energization of the magnet being adjustable by a rheostat 113.

The output shaft 28 is biased to tend to rotate in the direction opposite to that in which the spider 99 tends to drive it, by a spring 114 connected at one end to the arm 8 and at the other end to a screw 115 adjustable in a stationary frame member 116 by a nut 117 to adjust the spring tension.

At a predetermined speed of the shaft 1, and a corresponding speed of the generator 107 energizing the magnet 105, there will be a certain torque developed on the gear 101 by the generator disc 104, and a like torque will be applied to the gear 100 and shaft 28.

The torque on the shaft 28 can be balanced against the biasing torque of the spring 114 by adjusting the spring, or by adjusting the torque at the generator disc 104 by the rheostat 113; so that the shaft 28 and rheostat arm 8 can be brought to rest, with the shaft 1 running at the predetermined speed.

Thereafter any deviation of speed of shaft 1, say an increase, increases the speed of generator 107, causes it to energize the magnet 105 more strongly and develop more torque in the disc 104; more torque then appears at the shaft 28 and the spring 114 is overcome and the arm 8 moves over the resistor 7 to strengthen the field 3 and slow down the motor 2 and shaft 1, until the predetermined speed is restored.

In this connection, the spring 114 is preferably made long enough so that after adjustment its length and tension do not materially change upon angular movement of the arm 8.

A similar action occurs upon a tendency for the shaft 1 to decrease in speed.

When the torque at the generator disc 104 increases due to a speeding up of the generator 107 and strengthening of the magnet 105, as described, it also increases due to speeding up of the disc 104, effecting a double increase, and resulting in great sensitivity to change of speed.

When this degree of sensitivity is not wanted, simplification may be effected by omitting the generator 107 and its drive and magnet energizing circuit and substituting for the magnet 105 a permanent magnet as at 118, Fig. 6, adjustable toward and from the disc 104 by a threaded stem 119 secured to a frame 120 by lock nuts 121—122.

In the embodiment of Fig. 7 as compared with Fig. 3, a single differential gearing is utilized, comprising a spider 123 rotating gears 124—125 by means of pinions 126. The gear 124 is connected to the output shaft 28 and to the arm 8 of a rheostat comprising a resistor 7 in series with the field 3 of a motor 2 driving a shaft 1, having thereon a gear 103, all as reproduced from Fig. 5; the gear 103 driving the spider 123. An adjustable spring 114 adjustably biases the arm 8 as in Fig. 5.

The gear 125 drives a generator 127 having a torque developing load circuit 128 including an adjustable resistor 129. A generator field winding 130 is connected across the generator 127 and has an adjusting rheostat 131.

For a predetermined speed of the shaft 1, the torque of the generator 127 may be adjusted at its load resistor 129 or at its field rheostat 131, to cause the torque on the shaft 28 and arm 8 to balance the spring 114 and the arm 8 to be at rest; the spring also being adjustable to this end by the screw 115 as described for Fig. 5.

Thereafter, a change of speed of the shaft 1, say an increase, will cause the generator 127 to be driven faster and develop more torque thereat, and also cause more torque to go to the shaft 28 and arm 8. The arm 8 will then be moved over the resistor 7 against the biasing torque of the spring 114 and reduce the speed of the motor 2 and shaft 1 and generator 127 until the torque at the generator is again balanced by the torque of the spring 114 and the arm 8 comes to rest, and this will again be at the predetermined speed of the shaft 1.

A similar action occurs upon a reduction of speed of the shaft 1.

When the torque of the generator 127 is increased by an increase of load in its load circuit 128—129, caused by speeding up of the generator and an increase of its potential, torque is also increased by a further increase of load current caused by a stronger field due to the increase of potential, effecting a double increase of torque and great sensitivity to change of speed.

When this degree of sensitivity is not wanted, simplification may be effected by utilizing for the field of the generator a permanent magnet as at 132, Fig. 8, positionally adjustable to adjust the potential of the generator 127, by a threaded stem 133 reciprocable in a frame element 134 and by lock nuts 135—136.

In the forms of the invention of Figs. 5 to 8 inclusive in which single differential gearings are utilized, torque at the input (differential gearing spider 99 Fig. 5, or 123 Fig. 7) is transmitted toward the left as viewed in the drawing to the output 28; and to the right to a torque developing device (generator 107 Fig. 5, or 127 Fig. 7) whereat torque develops commensurable with speed. These torques are always equal, that being a factual condition of the differential gearing; and both rise and fall as the input speed rises and falls.

The torque on the output 28 is opposed by the biasing torque of the spring 114, and at a predetermined input speed these two torques on the output are equal and the output is at rest.

In the forms of the invention of Figs. 1 to 3 inclusive in which double differential gearings are utilized, there is again a biasing torque on the output 28 although not so obviously apparent.

In Fig. 3, the input (spiders 52 and 53) transmits a torque toward the left by way of gear 62 to the output 28, which rises and falls very little with change of input speed and is therefore relatively constant, and may be considered as a biasing torque; and the input transmits another torque to the output 28 by way of gear 61 opposing the biasing torque and rising and falling by relatively great amounts with change of input speed; and at a predetermined input speed, these two opposing torques on the output 28 are equal and it is at rest.

Torque from the input goes to the right to a torque developing device 85 at which developed torque varies with speed; and is always equal to the torque at the gear 61. Now while it is true that there is another torque developing device at 86, the torque of which is always the same as that at the gear 62 and which rises and falls with change of input speed; nevertheless the rise and fall of this torque is of such small amount compared to that of the torque at 85 that it is negligible, and may be considered as constant, and in fact operation is the same as if it were constant.

As to Figs. 1 and 2, it is believed that it will be apparent, after the above detailed explanation for Fig. 3, that in Fig. 1 the disc 30 of constant diameter causes a biasing torque to be exerted on the gear 27 and output 28, which varies very little or not at all with change of input speed and that the disc 42 of variable effective diameter causes an operating torque to be exerted on the gear 27 and output 28 varying widely with change of speed, the two torques being equal at a predetermined speed. And that in Fig. 2 (very similar to the explained action of Fig. 3) a biasing torque of relatively constant value is exerted on the output 28 by gear 62 and an operating torque varying widely with input speed is exerted on the output by gear 61.

The invention hereof as embodied in several forms comprises a rotary input (represented for example by the differential gearing spider 12 of Fig. 1 or 99 of Fig. 5); and a rotary output (represented for example by the shaft 28); and the parts therebetween and associated therewith; all as a self contained unit.

The invention is described herein as applied to a particular use, namely, to constant speed regulation, by driving the input from an element whose speed is to be regulated, and driving or actuating a speed controller thereof, by the output.

I claim:

1. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input power; one differential gear of the first gearing connected to a first torque developer the torque of which varies with variations of driven speed, and the other differential gear connected to the output, and applying a first torque thereto tending to rotate it in one direction; one differential gear of the second gearing connected to a second torque developer the torque of which varies at a different rate with variations of driven speed from that of the first torque developer, and the other differential gear connected to the output and applying a second torque thereto tending to rotate it in opposition to the first torque; and means causing the first and second torques to be equal at a predetermined input speed and unequal at other input speeds.

2. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input power; one differential gear of the first gearing connected to a first torque developer the torque of which varies with variations of driven speed, and the other differential gear connected to the output, and applying a first torque thereto tending to rotate it in one direction; one differential gear of the second gearing connected to a second torque developer the torque of which varies at a different rate with variations of driven speed from that of the first torque developer, and the other differential gear connected to the output and applying a second torque thereto tending to rotate it in opposition to the first torque; means causing the first and second torques to be equal at a predetermined input speed and unequal at other input speeds; and means to adjust the first and second torques one relative to the other to predetermine the input speed at which they are equal.

3. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input powers; one differential gear of the first gearing and one differential gear of the second gearing being connected to a speed ratio changer responsive to changes of input speed to change the speed ratio of the gears; the other differential gears of the first and second gearings being connected to the output and applying first and second torques thereto in opposite directions respectively; means causing the first and second torques to be equal at a one speed ratio corresponding to a predetermined input speed; and unequal at other speed ratios.

4. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input power; one differential gear of the first gearing and one differential gear of the second gearing being connected to a speed ratio changer responsive to changes of input speed to change the speed ratio of the gears; the other differential gears of the first and second gearings being connected to the output and applying first and second torques thereto in opposite directions respectively; means to cause the first and second torques to be equal at one speed ratio corresponding to a predetermined input speed; and unequal at other speed ratios; and means to adjust the speed ratio at any input speed to predetermine the input speed at which the torques are equal.

5. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input power; one differential gear of each gearing connected to the output for applying rotary power thereto in opposite directions; the other differential gears of the gearings connected to rotary speed controlling means constructed to control their respective speeds, and to be responsive to changes of input speed to cause the speed of one to increase relative to that of the other upon an increase of input speed and to decrease relative to that of the other upon a decrease of input speed; the said other differential gears having equal speeds at a predetermined input speed.

6. A unitary speed-responsive mechanism comprising a rotary input adapted to be driven at varying speed by rotary input power; a rotary output adapted to supply rotary output power; means to cause the rotary output to remain at rest at a predetermined input speed and to rotate in one direction or the other at input speeds above and below the predetermined speed, said means comprising: a first and a second differential gearing each comprising a spider element rotatably supporting a pinion and two differential gears pinion-driven by the spider element; the spider elements driven by the input power; one differential gear of each gearing connected to the output for applying rotary power thereto in opposite directions; the other differential gears of the gearings connected to rotary speed controlling means constructed to control their respective speeds, and to be responsive to changes of input speed to cause the speed of one to increase relative to that of the other upon an increase of input speed and to decrease relative to that of the other upon a decrease of input speed; the said other differential gears having equal speeds at a predetermined input speed; and means to adjust the relative speeds of the said other differential gears for any input speed to adjustably change the predetermined speed.

HARRY R. CANFIELD.

REFERENCES CITED

The following references are of record in the file of this patent:

UNITED STATES PATENTS

| Number | Name | Date |
| --- | --- | --- |
| 139,631 | Towns | June 3, 1873 |
| 2,441,605 | Trofimov | May 10, 1948 |

FOREIGN PATENTS

| Number | Country | Date |
| --- | --- | --- |
| 71,715 | Austria | May 10, 1916 |
| 297,066 | Germany | Mar. 21, 1917 |
| 332,311 | Germany | Jan. 27, 1921 |